(12) United States Patent
Niculas et al.

(10) Patent No.: US 12,358,188 B2
(45) Date of Patent: Jul. 15, 2025

(54) METHOD FOR MAKING EMBEDDED HYDROGEL CONTACT LENSES

(71) Applicant: Alcon Inc., Fribourg (CH)

(72) Inventors: Cornelius Daniel Niculas, Suwanee, GA (US); David Andrew Icenogle, Brookhaven, GA (US); Zahra Bassampour, Alpharetta, GA (US); Chandana Kolluru, Suwanee, GA (US)

(73) Assignee: Alcon Inc., Fribourg (CH)

( * ) Notice: Subject to any disclaimer, the term of this patent is extended or adjusted under 35 U.S.C. 154(b) by 97 days.

(21) Appl. No.: 18/306,625

(22) Filed: Apr. 25, 2023

(65) Prior Publication Data
US 2023/0339148 A1    Oct. 26, 2023

Related U.S. Application Data

(60) Provisional application No. 63/334,698, filed on Apr. 26, 2022.

(51) Int. Cl.
| | | |
|---|---|---|
| *B29C 39/02* | (2006.01) | |
| *B29C 39/00* | (2006.01) | |
| *B29C 39/26* | (2006.01) | |
| *B29C 39/36* | (2006.01) | |
| *G02B 1/04* | (2006.01) | |
| *B29K 33/00* | (2006.01) | |
| *B29K 83/00* | (2006.01) | |
| *B29K 101/10* | (2006.01) | |

(52) U.S. Cl.
CPC .......... *B29C 39/026* (2013.01); *B29C 39/006* (2013.01); *B29C 39/021* (2013.01); *B29C 39/028* (2013.01); *B29C 39/26* (2013.01); *B29C 39/36* (2013.01); *G02B 1/043* (2013.01); *B29K 2033/12* (2013.01); *B29K 2083/005* (2013.01); *B29K 2101/10* (2013.01)

(58) Field of Classification Search
CPC .................. B29C 39/18; B29C 39/026; B29C 2045/14131; B05D 1/30; B29D 11/00048
See application file for complete search history.

(56) References Cited

U.S. PATENT DOCUMENTS

| | | |
|---|---|---|
| 4,136,250 A | 1/1979 | Mueller et al. |
| 4,153,641 A | 5/1979 | Deichert et al. |
| | (Continued) | |

FOREIGN PATENT DOCUMENTS

EP          0632329 A1    1/1995

*Primary Examiner* — Michael A Tolin
*Assistant Examiner* — Hana C Page
(74) *Attorney, Agent, or Firm* — Jian Zhou

(57) ABSTRACT

The invention relates to a method for producing embedded hydrogel contact lenses each having an insert that comprises alignment features capable of capable of aligning the insert in depth and radial position in a female mold half during cast molding of an embedded hydrogel contact lens. The alignment features protrude from the front surface, are rotationally symmetric with respect to the central axis of the insert and independently have a shape having a curvature being greater than 2 folds of the curvature of the molding surface so as to minimize contacting area between the alignment features and the molding surface. The use of such an insert can simplify the process for producing embedded hydrogel contact lenses and enable the process to be implemented readily in an automatic production.

11 Claims, 2 Drawing Sheets

(56) References Cited

U.S. PATENT DOCUMENTS

| | | |
|---|---|---|
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,268,132 A | 5/1981 | Neefe |
| 4,276,402 A | 6/1981 | Chromecek |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,401,371 A | 8/1983 | Neefe |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,929,693 A | 5/1990 | Akashi |
| 4,954,586 A | 9/1990 | Toyoshim et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,070,215 A | 12/1991 | Bambury et al. |
| 5,079,319 A | 1/1992 | Mueller |
| 5,098,546 A | 3/1992 | Kawashima et al. |
| 5,156,726 A | 10/1992 | Nakada et al. |
| 5,166,345 A | 11/1992 | Akashi et al. |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,583,163 A | 12/1996 | Müller |
| 5,665,840 A | 9/1997 | Pöhlmann et al. |
| 5,712,356 A | 1/1998 | Bothe et al. |
| 5,760,100 A | 6/1998 | Nicolson et al. |
| 5,843,346 A | 12/1998 | Morrill |
| 5,849,841 A | 12/1998 | Mühlebach et al. |
| 5,894,002 A | 4/1999 | Boneberger et al. |
| 5,962,548 A | 10/1999 | Vanderlaan et al. |
| 5,981,675 A | 11/1999 | Valint, Jr. et al. |
| 6,017,121 A | 1/2000 | Chateau et al. |
| 6,019,914 A | 2/2000 | Lokshin et al. |
| 6,039,913 A | 3/2000 | Hirt et al. |
| 6,113,814 A | 9/2000 | Gemert et al. |
| 6,149,841 A | 11/2000 | Kumar |
| 6,165,408 A | 12/2000 | Steinmann |
| 6,166,236 A | 12/2000 | Bambury et al. |
| 6,221,303 B1 | 4/2001 | Steinmann |
| 6,296,785 B1 | 10/2001 | Nelson et al. |
| 6,303,687 B1 | 10/2001 | Müller |
| 6,348,604 B1 | 2/2002 | Nelson et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,762,264 B2 | 7/2004 | Kunzler et al. |
| 6,851,805 B2 | 2/2005 | Blum et al. |
| 6,867,245 B2 | 3/2005 | Iwata et al. |
| 6,995,192 B2 | 2/2006 | Phelan et al. |
| 7,104,648 B2 | 9/2006 | Dahi et al. |
| 7,214,809 B2 | 5/2007 | Zanini et al. |
| 7,423,074 B2 | 9/2008 | Lai et al. |
| 7,490,936 B2 | 2/2009 | Blum et al. |
| 7,556,750 B2 | 7/2009 | Xiao et al. |
| 7,584,630 B2 | 9/2009 | Van Gemert |
| 7,883,207 B2 | 2/2011 | Iyer |
| 7,931,832 B2 | 4/2011 | Pugh et al. |
| 7,977,430 B2 | 7/2011 | Devlin et al. |
| 7,999,989 B2 | 8/2011 | Asai et al. |
| 8,154,804 B2 | 4/2012 | McGinn et al. |
| 8,158,037 B2 | 4/2012 | Chopra et al. |
| 8,215,770 B2 | 7/2012 | Blum et al. |
| 8,348,424 B2 | 1/2013 | Pugh et al. |
| 8,415,405 B2 | 4/2013 | Maggio et al. |
| 8,475,529 B2 | 7/2013 | Clarke |
| 8,529,057 B2 | 9/2013 | Qiu et al. |
| 8,614,261 B2 | 12/2013 | Iwata et al. |
| 8,658,748 B2 | 2/2014 | Liu |
| 8,697,770 B2 | 4/2014 | Duis et al. |
| 8,741,188 B2 | 6/2014 | Chopra et al. |
| 8,835,525 B2 | 9/2014 | Kuyu et al. |
| 8,874,182 B2 | 10/2014 | Etzkorn et al. |
| 8,922,898 B2 | 12/2014 | Legerton et al. |
| 8,993,651 B2 | 3/2015 | Chang et al. |
| 9,052,438 B2 | 6/2015 | Xiao et al. |
| 9,097,840 B2 | 8/2015 | Chang |
| 9,097,916 B2 | 8/2015 | Chopra et al. |
| 9,103,965 B2 | 8/2015 | Chang |
| 9,155,614 B2 | 10/2015 | Blum et al. |
| 9,176,332 B1 | 11/2015 | Etzkorn et al. |
| 9,217,813 B2 | 12/2015 | Liu et al. |
| 9,296,158 B2 | 3/2016 | Pugh et al. |
| 9,465,234 B2 | 10/2016 | Chopra |
| 9,475,827 B2 | 10/2016 | Chang |
| 9,618,773 B2 | 4/2017 | Clarke |
| 9,731,437 B2 | 8/2017 | Pugh et al. |
| 9,889,615 B2 | 2/2018 | Pugh et al. |
| 9,904,074 B2 | 2/2018 | Duis |
| 9,977,260 B2 | 5/2018 | Pugh et al. |
| 10,081,697 B2 | 9/2018 | Huang |
| 10,197,707 B2 | 2/2019 | Xiao |
| 10,203,521 B2 | 2/2019 | Pugh et al. |
| 10,209,534 B2 | 2/2019 | Alli et al. |
| 10,232,531 B1 | 3/2019 | Etzkorn et al. |
| 10,301,451 B2 | 5/2019 | Jing |
| 10,465,047 B2 | 11/2019 | Jing |
| 2004/0141150 A1 | 7/2004 | Roffman et al. |
| 2006/0055883 A1* | 3/2006 | Morris ............... G02C 7/028 351/159.44 |
| 2009/0091818 A1 | 4/2009 | Haddock et al. |
| 2010/0076553 A1 | 3/2010 | Pugh et al. |
| 2011/0026144 A1* | 2/2011 | Shyu ............... G02B 7/021 359/819 |
| 2011/0157544 A1 | 6/2011 | Pugh et al. |
| 2012/0140167 A1 | 6/2012 | Blum |
| 2015/0062528 A1* | 3/2015 | Barre ............... B29C 65/7841 351/159.73 |
| 2015/0145155 A1* | 5/2015 | Pugh ............... B29C 43/02 264/1.36 |
| 2016/0004097 A1 | 1/2016 | Pugh et al. |
| 2016/0317090 A1* | 11/2016 | Han ............... G02C 7/049 |
| 2019/0300654 A1* | 10/2019 | Wu ............... B29D 11/00067 |
| 2022/0091439 A1 | 3/2022 | Legerton et al. |
| 2023/0166467 A1 | 6/2023 | Zheng et al. |

* cited by examiner

METHOD FOR MAKING EMBEDDED HYDROGEL CONTACT LENSES

This application claims the benefit under 35 USC § 119 (e) of U.S. provisional application No. 63/334,698 filed 26 Apr. 2022, herein incorporated by reference in its entirety.

The present invention generally relates to a method for producing embedded hydrogel contact lenses. In addition, the present invention provides embedded hydrogel contact lenses produced according to a method of the invention.

BACKGROUND

Hydrogel contact lenses are widely used for correcting many different types of vision deficiencies due to their softness for wearing comfort. They are made of a hydrated, crosslinked polymeric material that contains from about 20% to about 75% by weight of water within the lens polymer matrix at equilibrium. Hydrogel contact lenses generally are produced according to the conventional full cast-molding process. Such a conventional manufacturing process comprises at least the following steps: lens molding (i.e., curing a polymerizable composition in lens molds), demolding (i.e., removing lenses from molds), extracting lenses with an extraction medium, hydrating lenses, packaging and sterilizing the hydrated lenses. During the lens hydration, the hydrogel contact lenses will absorb water and typically can swell significantly in size.

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,104,648, 7,490,936, 7,883,207, 7,931,832, 8,154,804, 8,215,770, 8,348,424, 8,874,182, 8,922,898, 9,155,614, 9,176,332, 9,296,158, 9,618,773, 9,731,437, 9,889,615, 9,977,260, 10,203,521, and 10,209,534; and U.S. Pat. Appl. Pub. Nos. 2004/0141150, 2009/0091818, 2010/0076553, 2011/0157544, and 2012/0140167).

An insert typically needs to be placed and fixed precisely in a specifically designed position in an embedded hydrogel contact lens. It is a great challenge to produce embedded hydrogel contact lenses that comprise one or more inserts embedded in specific positions in the embedded hydrogel contact lenses. A typical approach is to use molds having positioning guides (posts) provided on their molding surface for cast-molding embedded hydrogel contact lenses. Those positioning guides (posts) provides means for precisely positioning inserts in molds during cast-molding process. However, by using such molds with positioning guides (posts), small holes derived from those positioning guides (posts) are formed in resultant embedded hydrogel contact lenses. Those small holes in the embedded hydrogel lenses are susceptible to bioburden trapping.

Therefore, there is still a need for producing embedded hydrogel contact lenses (preferably embedded silicone hydrogel contact lenses) having inserts positioned accurately therein in a relatively efficient and consistent manner and which can be readily implemented in a production environment.

SUMMARY OF THE INVENTION

In some aspects, the invention provides a method for producing embedded hydrogel contact lenses, the method of invention comprising the steps of: (1) obtaining a lens mold, wherein the lens mold comprises a female lens mold half having a first molding surface and a male lens mold half having a second molding surface, wherein the first molding surface defines the anterior surface of an embedded hydrogel contact lens, wherein the second molding surface defines the posterior surface of the embedded hydrogel contact lens, wherein the female and male lens mold halves are configured to receive each other such that a mold cavity is formed between the first and second molding surfaces when the mold is closed; (2) obtaining an insert which is made of a polymeric material and comprises a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half, wherein the alignment features protrude from the front surface, have an identical maximum height and are rotationally symmetric with respect to the central axis of the insert, wherein the alignment features have identical shapes have identical shapes each having a curvature greater than about 2 folds of the curvature of the molding surface at contacting point of each alignment feature with the first molding surface; (3) placing the insert in a female lens mold half in a way to ensure the insert be centered in the lens female lens mold half on the first molding surface; (4) introducing a lens-forming composition in the female lens mold half in an amount sufficient to immerse the insert in the female lens mold half; (5) placing the male lens mold half on top of the female lens mold half and closing the male and female lens mold halves to form a molding assembly comprising the lens-forming composition and the insert immersed therein in the molding assembly; (6) curing the lens-forming composition in the molding assembly to form an embedded hydrogel lens precursor that comprise a bulk hydrogel material formed from the lens-forming composition and the insert embedded in the bulk hydrogel material and centered in the embedded hydrogel lens precursor; (7) separating the lens mold obtained in step (6) into the male and female lens mold halves, with the embedded hydrogel lens precursor adhered on a lens-adhered lens mold half which is one of the male and female lens mold halves; (8) removing the embedded hydrogel lens precursor from the lens-adhered lens mold half (preferably before the embedded hydrogel lens precursor is contact with water or any liquid); and (9) subjecting the embedded hydrogel lens precursor to post-molding processes including a hydration process and one or more other processes selected from the group consisting of extraction, surface treatment, packaging, sterilization, and combinations thereof to form the embedded hydrogel contact lens.

In other aspects, the invention provides an embedded hydrogel contact lens, comprising: an anterior surface, an opposite posterior surface, a bulk hydrogel material, and an insert embedded in the bulk hydrogel material, wherein the insert is made of a polymeric material and has a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half during cast molding process, wherein the alignment features protrude from the front surface, have an identical maximum height and are rotationally symmetric with respect to the central axis of the insert, wherein the alignment features have identical shapes each having a curvature greater than 2 folds of the curvature of the anterior surface at one or more places in contact with the anterior surface, wherein the insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
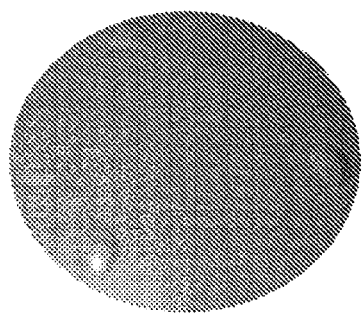
FIG. 1 illustrates an insert of the invention that comprises alignment features on its front surface according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" or "non-silicone hydrogel material" interchangeably refers to a hydrogel that is theoretically free of silicon.

A "male mold half" or "base curve mold half" interchangeably refers to a mold half having (1) a molding surface that is a substantially convex surface and that defines the posterior (back) surface of a contact lens (or an insert) and (2) a central axis that is the normal line at the center of the molding surface.

A "female mold half" or "front curve mold half" interchangeably refers to a mold half having (1) a molding surface that is a substantially concave surface and that defines the anterior (front) surface of a contact lens (or an insert) and (2) a central axis that is the normal line at the center of the molding surface.

The term "anterior surface", "front surface", "front curve surface" or "FC surface" in reference to a contact lens or an insert, as used in this application, interchangeably means a surface of the contact lens or insert that faces away from the eye during wear. The anterior surface (front surface) is typically substantially convex.

The "posterior surface", "back surface", "base curve surface" or "BC surface" in reference to a contact lens or insert, as used in this application, interchangeably means a surface of the contact lens or insert that faces towards the eye during wear. The posterior surface (back surface) is typically substantially concave.

An "embedded hydrogel contact lens" refers a hydrogel contact lens comprising at least one insert which is embedded fully or partially within the bulk hydrogel material of the embedded hydrogel contact lens.

In this application, an "insert" refers to any preformed article which has a diameter of up to 13 mm, a front (anterior) surface, an opposite back (posterior) surface, a central axis, and a thickness less than any thickness of an embedded hydrogel contact lens in the region where the insert is embedded. It is understood that the insert must be smaller than the embedded hydrogel contact lens in dimension, so as to be embedded in the bulk material of the embedded hydrogel contact lens. The insert can be made of a polymeric material that can be a non-hydrogel material or a hydrogel material. Examples of preferred inserts include without limitation thin rigid inserts for providing rigid center optics for masking astigmatism like a rigid gas permeable (RGP) contact lens, multifocal lens inserts, photochromic inserts, cosmetic inserts having color patterns printed thereon, etc.

In this application, a central axis of an insert (or contact lens) refers to an imaginary line passing through both the centers of the anterior (front) and posterior (back) surface of the insert (or contact lens).

In accordance with the invention, a non-hydrogel material can be any material that can absorb less than 5% (preferably about 4% or less, more preferably about 3% or less, even more preferably about 2% or less) by weight of water when being fully hydrated.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

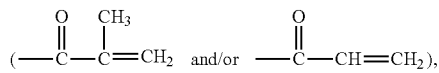

allyl, vinyl, styrenyl, or other C=C containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

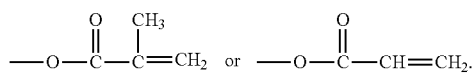

An "(meth)acrylamido monomer" refers to a vinylic monomer having one sole group of

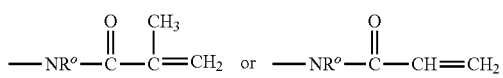

in which $R^o$ is H or $C_1$-$C_4$ alkyl.

The term "aryl acrylic monomer" refers to an acrylic monomer having at least one aromatic ring.

An "(meth)acryloxy monomer" or "(meth)acryloyloxy monomer" refers to a vinylic monomer having one sole group of

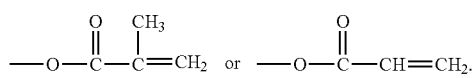

An "(meth)acrylamido monomer" refers to a vinylic monomer having one sole group of

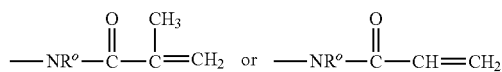

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); 1H NMR (Proton nuclear magnetic resonance) spectroscopy, etc.

A "polysiloxane segment" or "polydiorganosiloxane segment" interchangeably refers to a polymer chain segment (i.e., a divalent radical) of

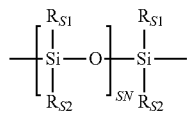

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl; and a photochromic organic radical having a photochromic group.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The "oxygen permeability", $Dk_i$, of a material is the rate at which oxygen will pass through a material and can be measured at about 34-35° C. according to the procedures described in Example 1. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The term "modulus" or "elastic modulus" in reference to a contact lens or a material means the tensile modulus or Young's modulus which is a measure of the stiffness of a contact lens or a material. The modulus can be measured according to the procedures described in Example 1.

In general, the invention is directed to a method for producing embedded hydrogel contact lenses having an insert that is embedded completely or partially in the bulk hydrogel material of the embedded hydrogel contact lens and comprises alignment features capable of capable of aligning the insert in depth and radial position in a female mold half during cast molding of an embedded hydrogel contact lens. This invention is based on the discovery that an insert can have alignment features (e.g., three bumps shown in FIG. 1 or three arcs shown in FIG. 2) for centrally aligning the insert on the molding surface of a female lens mold half with respect to the central axis of the female lens mold half. The alignment features protrude from the front surface, are rotationally symmetric with respect to the central axis of the insert and independently have a shape having a curvature being greater than 2 folds of the curvature of the molding surface so as to minimize contacting area between the alignment features and the molding surface. With such alignment features on the front surface, such an insert can be accurately and centrally positioned in a female mold half on its molding surface. The contacting area of the insert with the molding surface of the female lens mold half will be limited can be minimized and the height of the alignment features will determine the distance between the insert's front surface and the lens's anterior surface. The use of such an insert can simplify the process for producing embedded hydrogel contact lenses and enable the process to be implemented readily in an automatic production. Furthermore, positioning guides (posts) for aligning the insert in the female lens mold half can be eliminated and no holes derived from the positioning guides (posts) will not be formed in resultant embedded hydrogel contact lenses, thereby eliminating protein and/or bioburden buildup in those holes in the embedded hydrogel contact lenses.

In some aspects, the invention provides a method for producing embedded hydrogel contact lenses, the method of invention comprising the steps of: (1) obtaining a lens mold, wherein the lens mold comprises a female lens mold half having a first molding surface and a male lens mold half having a second molding surface, wherein the first molding surface defines the anterior surface of an embedded hydrogel contact lens, wherein the second molding surface defines the posterior surface of the embedded hydrogel contact lens, wherein the female and male lens mold halves are configured to receive each other such that a mold cavity is formed between the first and second molding surfaces when the mold is closed; (2) obtaining an insert which is made of a polymeric material and comprises a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half, wherein the alignment features protrude from the front surface, have an identical maximum height and are rotationally symmetric with respect to the central axis of the insert, wherein the alignment features have identical shapes each having a curvature greater than about 2 folds of the curvature of the molding surface at contacting point of each alignment feature with the first molding surface; (3) placing the insert in a female lens mold half in a way to ensure the insert be centered in the lens female lens mold half on the first molding surface; (4) introducing a lens-forming composition in the female lens mold half in an amount sufficient to immerse the insert in the female lens mold half; (5) placing the male lens mold half on top of the female lens mold half and closing the male and female lens mold halves to form a molding assembly comprising the lens-forming composition and the insert immersed therein in the molding assembly; (6) curing the lens-forming composition in the molding assembly to form an embedded hydrogel lens precursor that comprise a bulk hydrogel material formed from the lens-forming composition and the insert embedded in the bulk hydrogel material and centered in the embedded hydrogel lens precursor; (7) separating the lens mold obtained in step (6) into the male and female lens mold halves, with the embedded hydrogel lens precursor adhered on a lens-adhered lens mold half which is one of the male and female lens mold halves; (8) removing the embedded hydrogel lens precursor from the lens-adhered lens mold half (preferably before the embedded hydrogel lens precursor is contact with water or any liquid); and (9) subjecting the embedded hydrogel lens precursor to post-molding processes including a hydration process and one or more other processes selected from the group consisting of extraction, surface treatment, packaging, sterilization, and combinations thereof to form the embedded hydrogel contact lens.

In other aspects, the invention provides an embedded hydrogel contact lens, comprising: an anterior surface, an opposite posterior surface, a bulk hydrogel material, and an insert embedded in the bulk hydrogel material, wherein the insert is made of a polymeric material and has a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half during cast molding process, wherein the alignment features protrude from the front surface, have an identical maximum height and are rotationally symmetric with respect to the central axis of the insert, wherein the alignment features have identical shapes each having a curvature greater than 2 folds of the curvature of the anterior surface at one or more places in contact with the anterior surface, wherein the insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.

Mold halves for making contact lenses (or inserts) are well known to a person skilled in the art and, for example, are employed in cast molding. In general, a molding assembly comprises at least two mold halves, one male half and one female mold half. The male mold half has a first molding (or optical) surface which is in direct contact with a polymerizable composition for cast molding of a contact lens (or an insert) and defines the posterior (back) surface of a molded contact lens (or a molded insert); and the female mold half has a second molding (or optical) surface which is in direct contact with the polymerizable composition and defines the anterior (front) surface of the molded contact lens (or molded insert). The male and female mold halves are configured to receive each other such that a lens- or insert-forming cavity is formed between the first molding surface and the second molding surface.

Methods of manufacturing mold halves for cast-molding a contact lens or an insert are generally well known to those of ordinary skill in the art. The process of the present invention is not limited to any particular method of forming a mold half. In fact, any method of forming a mold half can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making mold halves can be used to make mold halves for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used.

In accordance with the invention, an insert is made of any plastic material.

In a preferred embodiment, an insert is made of a hard plastics (preferably a crosslinked polymethylmethacrylate), e.g., any one known to a person skilled in the art.

In another preferred embodiment, an insert is made of a crosslinked silicone polymer (or a silicone rubber or elastomer as known to a person skilled in the art), e.g., any one known to a person skilled in the art. A crosslinked silicone material has three-dimensional polymer networks (i.e., polymer matrix), is insoluble in water, and has an equilibrium water content of about 5% or less, preferably about 3% or less, more preferably about 2% or less) by weight (i.e., in fully-hydrated state).

In another preferred embodiment, an insert is made of a non-silicone hydrogel material (any one of those described later in this application or known to a person skilled in the art).

In another preferred embodiment, an insert is made of a silicone hydrogel material (any one of those described later in this application or known to a person skilled in the art).

In another preferred embodiment, an insert is made of a rigid gas permeable material (e.g., a material made from fluorosilicone acrylates or known to a person skilled in the art).

In another preferred embodiment, an insert comprises repeating units of at least one polymerizable photochromic compound (i.e., at least one photochromic vinylic monomer), at least one UV-absorbing vinylic monomer, at least one UV/HEVL-absorbing vinylic monomer, a fluorescent vinylic monomer, or combinations thereof.

In another preferred embodiment, an insert comprises at least one photochromic dye or pigment, at least one color-filtering material for correcting color blindness, a diffractive material, a high refractive-index material, or combinations.

In another preferred embodiment, an insert is made of a hydrophobic crosslinked acrylic material that has an equilibrium water content of less than 5% by weight and comprises at least about 55% (preferably at least about 60%, more preferably at least about 65% even more preferably at least about 70%) by mole of repeating units of one or more acrylic monomers and/or one or more acrylic crosslinker or crosslinking agent and at least about 6% by mole (preferably at least about 8% by mole, more preferably at least about 10% by mole, even more preferably at least about 12% by mole) of repeating units at least one vinylic crosslinking agent.

Any hydrophobic acrylic monomers can be used in forming a hydrophobic material of the inventions. Examples of hydrophobic acrylic monomers includes silicone-containing acrylic monomers (any one of those described below in this application), non-silicone hydrophobic acrylic monomers (any one of those described below in this application), fluorine-containing acrylic monomers (any one of those described below in this application), aryl acrylic monomers (any one of those described below in this application), and combinations thereof.

An aryl acrylic monomer refers to an acrylic monomer having at least one aryl moiety.

It is also understood that any hydrophobic vinylic monomer can be used as a substitute for a hydrophobic acrylic monomer, so long as it comprises at least one H-bond acceptor such as ester bond, amide bond, carbonate bond, carbamate bond, ether bond, or combinations thereof. Examples of such hydrophobic monomers include vinyl alkanoates (any one of those described later), vinyloxyalkanes (any one of those described later), and mixtures thereof.

It is understood that the mole percentages of each of the components of the hydrophobic crosslinked acrylic material can be obtained based on mole percentages of its corresponding polymerizable component (material) in an insert-forming composition for making the insert.

In accordance with the invention, a hydrophobic crosslinked acrylic material comprises repeating units of at least one vinylic crosslinking agent. Any suitable vinyl crosslinking agents can be used in the invention. Examples of preferred vinylic cross-linking agents include without limitation: acrylic crosslinking agents (crosslinkers) (any one of those described later in this application), allyl methacrylate, allyl acrylate, an aryl crosslinking agent (e.g., divinylbenzene, 2-methyl-1,4-divinylbenzene, bis(4-vinylphenyl)methane, 1,2-bis(4-vinylphenyl)ethane, etc.), triallyl isocyanurate, 2,4,6-triallyloxy-1,3,5-triazine, 1,2,4-trivinylcyclohexane, or combinations thereof. It is understood that vinylic crosslinking agents are required for imparting the desired rigidity to the crosslinked polymeric material of the rigid hydrophobic insert.

In a preferred embodiment, the hydrophobic crosslinked acrylic material comprises repeating units of at least one acrylic crosslinking agent (any one of those described later).

In another preferred embodiment, the hydrophobic crosslinked acrylic material comprises repeating units of at least one aryl crosslinking agent (any one of those described later in this application).

In another preferred embodiment, the hydrophobic crosslinked acrylic material comprises repeating units of at least one vinyl-functional polysiloxane that comprises at least two vinyl groups each directly attached to one silicon atom and at least 15% by mole of siloxane units each having at least one phenyl substituent.

Examples of such vinyl functional polysiloxanes include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), or combinations thereof. Preferably, the vinyl-functional polysiloxane is vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), or mixtures thereof.

In accordance with the invention, an insert of the invention preferably comprises at least three alignment features on the front surface. The alignment features can be a bump in any shape (preferably a circle bump or an oval bump) or a ridge in a shape of an arc. The alignment features are preferably located in an annual zone having an inner circular edge, an outer circular edge that is the peripheral edge of the front surface of the insert, and a width of about 3.0 mm or less (preferably about 2.5 mm or less, more preferably about 2.0 mm or less, even more preferably about 1.5 mm or less).

In accordance with the invention, an inert of the invention can be prepared by cast-molding of an insert-forming composition (i.e., a polymerizable composition) in insert molds.

In accordance with the invention, the female insert mold half has, in its molding surface, depressions that will in turn define the alignment features.

An insert-forming composition can be prepared by mixing all polymerizable materials as described above in the desired proportions, together with one or more polymerization initiators (thermal polymerization initiators or photoinitiators) in the presence or preferably in the absence of a non-reactive organic solvent (i.e., a non-reactive diluent) described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethyl hexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenyl-phosphine oxide; and bis-(2,6-dichlorobenzoyl)-4-N-butylphenylphosphine oxide. Reactive photoinitiators which can be incorporated, e.g., into a macromer or can be used as a special monomer are also suitable. Examples of reactive photoinitiators are those disclosed in EP632329.

In accordance with the invention, the insert can be placed in a female lens mold half according to any techniques known to a person skilled in the art, so long as the insert can be precisely placed to ensure the insert be centered in the lens female lens mold half on the first molding surface. Examples of preferred systems for insert placement and positioning includes without limitation those described in U.S. patent application Ser. No. 18/070,189 filed 29 Nov. 2022 entitled "SYSTEMS AND METHODS FOR INSERT PLACEMENT TO FABRICATE HYBRID CONTACT LENSES".

In accordance with the invention, the bulk hydrogel material, formed from a lens-forming composition (i.e., a polymerizable composition), can be a non-silicone hydrogel material (any one of those described later in this application), or preferably a silicone hydrogel material (any one of those described later in this application).

A non-silicone hydrogel material can be formed from a lens-forming composition (i.e., polymerizable composition), e.g., one for forming a non-silicone hydrogel contact lens. Typically, a lens-forming composition for forming a non-silicone hydrogel material is either (1) a monomer mixture comprising (a) at least one hydrophilic vinylic monomer (e.g., hydroxyl-containing vinylic monomer, N-vinyl amide monomer, (meth)acrylamido monomer, or combinations thereof), (b) a vinylic crosslinker, and (c) at least one component selected from the group consisting of a hydrophobic vinylic monomer, a free-radical initiator (photoinitiator or thermal initiator), a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a vinylic crosslinker, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent, and combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous lens-forming compositions (polymerizable composition) for forming non-silicone hydrogel materials have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a lens-forming composition of the invention.

Preferably, a non-silicone hydrogel material comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3- hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, hydroxyethyl (meth)acrylamide, and vinyl alcohol.

A silicone hydrogel material can be formed from a lens-forming composition (i.e., a polymerizable composition) for forming a silicone hydrogel contact lens. Numerous lens-forming compositions for forming silicone hydrogel contact lenses have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a lens-forming composition of the invention.

In accordance with the invention, a silicone hydrogel material as the bulk hydrogel material of an embedded hydrogel contact lens of the invention comprises (1) repeating units of at least one polysiloxane vinylic monomer and/or at least one polysiloxane vinylic crosslinker and (2) repeating units of at least one hydrophilic vinylic monomer.

Any polysiloxane vinylic monomers can be used in the invention. Examples of preferred polysiloxanes vinylic monomers include without limitation: those of formula (M1) which are described later in this application and can be obtained from commercial suppliers (e.g., Shin-Etsu, Gelest, etc.); those prepared according to procedures described in patents, e.g., U.S. Pat. Nos. 5,070,215, 6,166,236, 6,867, 245, 8,415,405, 8,475,529, 8,614,261, and 9,217,813; those prepared by reacting a hydroxyalkyl (meth)acrylate or (meth)acrylamide or a (meth)acryloxypolyethylene glycol with a mono-epoxypropyloxypropyl-terminated polydimethylsiloxane; those prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; and those prepared by reacting isocyanatoethyl (meth)acrylate with a mono-carbinol-terminated polydimethylsiloxane according to coupling reactions well known to a person skilled in the art.

Any suitable polysiloxane vinylic crosslinkers can be used in the invention. Examples of preferred polysiloxane vinylic crosslinkers include without limitation: polysiloxane vinylic crosslinkers each comprising hydrophilized siloxane units each having one methyl substituent and one organic radical including at least one H-bond donor (preferably hydroxyl groups); di-(meth)acryloyl-terminated polydimethyl-siloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyl-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), as described later in this application. They can be prepared according to the procedures disclosed in U.S. patent Ser. No. 10/081,697.

Another class of preferred polysiloxane vinylic crosslinkers are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyanatoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416, 132, 5,449,729, 5,760,100, 7,423,074, 8,529,057, 8,835,525, 8,993,651, 10,301,451, and 10,465,047.

Preferably, the silicone hydrogel material comprises repeating units of at least one first polysiloxane vinylic crosslinker comprising hydrophilized siloxane units each having one methyl substituent and one organic radical including at least one H-bond donor (preferably hydroxyl groups).

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers(as described later in this application), N-2-hydroxyethyl vinyl carbamate, N-carboxyvinyl-β-alanine (VINAL), N-carboxyvinyl-α-alanine, and combinations thereof.

In accordance with the invention, the silicone hydrogel material can further comprise repeating units of at least one silicone-containing vinylic monomer having a bis(trialkylsilyloxy)-alkylsilyl group or a tris(trialkylsilyloxy)silyl group. Examples of such preferred silicone-containing vinylic monomers include without limitation those of formula (M2), which are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

In accordance with the invention, the silicone hydrogel material can also comprise repeating units of one or more hydrophobic non-silicone vinylic monomers. Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth)acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, and combinations thereof.

In accordance with the invention, the silicone hydrogel material can also comprise repeating units of one or more non-silicone vinylic crosslinkers. Examples of preferred non-silicone vinylic cross-linking agents are described later in this application.

In accordance with the invention, the silicone hydrogel material can also comprises repeating units of other polymerizable materials, such as, a UV-absorbing vinylic monomer, a UV/high-energy-violet-light ("HEVL") absorbing vinylic monomer, polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3'"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In accordance with the invention, the silicone hydrogel material has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

A lens-forming composition or an insert-forming composition can be a solventless clear liquid prepared by mixing all polymerizable components (or materials) and other necessary component(or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described later in this application).

A solventless polymerizable composition (a lens-forming or insert-forming composition) typically comprises at least one blending vinylic monomer as a reactive solvent for dissolving all other polymerizable components. Examples of preferred blending vinylic monomers are described later in this application. Preferably, methyl methacrylate is used as a blending vinylic monomer in preparing a solventless polymerizable composition.

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, and mixtures thereof.

The insert-forming composition and the lens-forming composition can be introduced into the insert-molding cavity and the lens-molding cavity respectively according to any techniques known to a person skilled in the art.

The curing of a polymerizable composition within the insert-molding or lens-molding cavity of a mold can be carried out thermally (i.e., by heating) or actinically (i.e., by actinic radiation, e.g., UV radiation and/or visible radiation) to activate the polymerization initiators.

The actinic polymerization of the polymerizable composition in a mold can be carried out by irradiating the closed mold with the polymerizable composition therein with an UV or visible light, according to any techniques known to a person skilled in the art.

The thermal polymerization of the polymerizable composition in a mold can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

After the curing step, the steps of opening a mold (i.e., separating the male lens mold half from the female lens mold half with the embedded silicone hydrogel lens precursor attached onto one of the male and female lens mold halves) and delensing (i.e., removing the embedded silicone hydrogel lens precursor from the lens-adhered lens mold half) are carried out according to any techniques known to a person skilled in the art.

After the embedded hydrogel lens precursor is delensed, it typically is extracted with an extraction medium as well known to a person skilled in the art. The extraction liquid medium is any solvent capable of dissolving the diluent(s), unpolymerized polymerizable materials, and oligomers in the embedded silicone hydrogel lens precursor. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded hydrogel contact lens can then be hydrated according to any method known to a person skilled in the art.

The hydrated embedded hydrogel contact lens can further subject to further processes, such as, for example, surface treatment, packaging in lens packages with a packaging solution which is well known to a person skilled in the art;

sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing embedded hydrogel contact lenses, comprising the steps of:
   (1) obtaining a lens mold, wherein the lens mold comprises a female lens mold half having a first molding surface and a male lens mold half having a second molding surface, wherein the first molding surface defines the anterior surface of an embedded hydrogel contact lens, wherein the second molding surface defines the posterior surface of the embedded hydrogel contact lens, wherein the female and male lens mold halves are configured to receive each other such that a mold cavity is formed between the first and second molding surfaces when the mold is closed;
   (2) obtaining an insert which is made of a polymeric material and comprises a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half, wherein the alignment features protrude from the front surface, have an identical maximum height and are rotationally symmetric with respect to the central axis of the insert, wherein the alignment features have identical shapes each having a curvature greater than about 2 folds of the curvature of the molding surface at contacting point of each alignment feature with the first molding surface;
   (3) placing the insert in a female lens mold half in a way to ensure the insert be centered in the lens female lens mold half on the first molding surface;
   (4) introducing a lens-forming composition in the female lens mold half in an amount sufficient to immerse the insert in the female lens mold half;
   (5) placing the male lens mold half on top of the female lens mold half and closing the male and female lens mold halves to form a molding assembly comprising the lens-forming composition and the insert immersed therein in the molding assembly;
   (6) curing the lens-forming composition in the molding assembly to form an embedded hydrogel lens precursor that comprise a bulk hydrogel material formed from the lens-forming composition and the insert embedded in the bulk hydrogel material and centered in the embedded hydrogel lens precursor;
   (7) separating the lens mold obtained in step (6) into the male and female lens mold halves, with the embedded hydrogel lens precursor adhered on a lens-adhered lens mold half which is one of the male and female lens mold halves;
   (8) removing the embedded hydrogel lens precursor from the lens-adhered lens mold half (preferably before the embedded hydrogel lens precursor is contact with water or any liquid); and
   (9) subjecting the embedded hydrogel lens precursor to post-molding processes including a hydration process and one or more other processes selected from the group consisting of extraction, surface treatment, packaging, sterilization, and combinations thereof to form the embedded hydrogel contact lens.
2. The method of embodiment 1, wherein the step of (6) curing the lens-forming composition is carried out actinically by using UV and/or visible light.
3. The method of embodiment 1, wherein the step of (6) curing the lens-forming composition is carried out thermally by heating the first molding assembly in an oven at one or more curing temperatures selected from about 40° C. to about 100° C.
4. An embedded hydrogel contact lens, comprising:
   an anterior surface, an opposite posterior surface, a bulk hydrogel material, and an insert embedded in the bulk hydrogel material,
   wherein the insert is made of a polymeric material and has a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half during cast molding process, wherein the alignment features protrude from the front surface, have an identical maximum height and are rotationally symmetric with respect to the central axis of the insert, wherein the alignment features have identical shapes each having a curvature greater than 2 folds of the curvature of the anterior surface at one or more places in contact with the anterior surface, wherein the insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.
5. The method of any one of embodiments 1-3 or the embedded hydrogel contact lens of embodiment 4, wherein the alignment features are bumps.
6. The method of any one of embodiments 1-3 or the embedded hydrogel contact lens of embodiment 4, wherein the alignment features are circle bumps.
7. The method of any one of embodiments 1-3 or the embedded hydrogel contact lens of embodiment 4, wherein the alignment features are bumps.

8. The method of any one of embodiments 1-3 or the embedded hydrogel contact lens of embodiment 4, wherein the alignment features are ridges.
9. The method of any one of embodiments 1-3 or the embedded hydrogel contact lens of embodiment 4, wherein the alignment features are ridges in a shape of arc.
10. The method or embedded hydrogel contact lens of any one of embodiments 5 to 9, wherein the insert comprises 3 alignment features.
11. The method or embedded hydrogel contact lens of any one of embodiments 5 to 10, wherein the alignment features are located in an annual zone having an inner circular edge, an outer circular edge that is the peripheral edge of the front surface of the insert, and a width of about 3.0 mm or less.
12. The method or embedded hydrogel contact lens of embodiment 11, wherein the width of the annular zone is about 2.5 mm or less.
13. The method or embedded hydrogel contact lens of embodiment 11, wherein the width of the annular zone is about 2.0 mm or less.
14. The method or embedded hydrogel contact lens of embodiment 11, wherein the width of the annular zone is about 1.5 mm or less.
15. The method of any one of embodiments 1-3 and 5-14 or the embedded hydrogel contact lens of any one of embodiments 4-14, wherein the polymeric material of the insert comprises repeating units of at least one polymerizable photochromic compound (i.e., photochromic vinylic monomer), at least one UV-absorbing vinylic monomer, at least one UV/HEVL-absorbing vinylic monomer, at least one fluorescent vinylic monomer, or combinations thereof.
16. The method of any one of embodiments 1-3 and 5-15 or the embedded hydrogel contact lens of any one of embodiments 4-15, wherein the insert comprises at least one color-filtering material for correcting color blindness, a diffractive material, a high refractive-index material, or combinations.
17. The method of any one of embodiments 1-3 and 5-16 or the embedded hydrogel contact lens of any one of embodiments 4-16, wherein the polymeric material of the insert is a hard plastics.
18. The method or the embedded hydrogel contact lens of embodiment 17, wherein the hard plastics is a crosslinked polymethylmethacrylate.
19. The method of any one of embodiments 1-3 and 5-16 or the embedded hydrogel contact lens of any one of embodiments 4-16, wherein the polymeric material of the insert is a crosslinked silicone polymer that has three-dimensional polymer networks, is insoluble in water, and has an equilibrium water content of about 5% or less by weight.
20. The method or the embedded hydrogel contact lens of embodiment 19, wherein the crosslinked silicone polymer has an equilibrium water content of about 3% or less (preferably about 2% or less) by weight.
21. The method of any one of embodiments 1-3 and 5-16 or the embedded hydrogel contact lens of any one of embodiments 4-16, wherein the polymeric material of the insert is a rigid gas permeable material.
22. The method of any one of embodiments 1-3 and 5-16 or the embedded hydrogel contact lens of any one of embodiments 4-16, wherein the polymeric material of the insert is a hydrophobic crosslinked acrylic material that has an equilibrium water content of less than 5% by weight and comprises at least 55% by mole of repeating units of one or more acrylic monomers and/or one or more acrylic crosslinker and at least about 6% by mole of repeating units of at least one vinylic crosslinking agent.
23. The method or embedded hydrogel contact lens of embodiment 22, wherein the hydrophobic crosslinked acrylic material has an equilibrium water content of about 4% or less by weight.
24. The method or embedded hydrogel contact lens of embodiment 22, wherein the hydrophobic crosslinked acrylic material has an equilibrium water content of about 3% or less by weight.
25. The method or embedded hydrogel contact lens of embodiment 22, wherein the hydrophobic crosslinked acrylic material has an equilibrium water content of about 2% or less by weight.
26. The method or embedded hydrogel contact lens of any one of embodiments 22 to 25, wherein the hydrophobic crosslinked acrylic material comprises at least about 60% by mole of repeating units of said one or more acrylic monomers and/or said one or more acrylic crosslinker.
27. The method or embedded hydrogel contact lens of any one of embodiments 22 to 25, wherein the hydrophobic crosslinked acrylic material comprises at least about 70% by mole of repeating units of said one or more acrylic monomers and/or said one or more acrylic crosslinker.
28. The method or embedded hydrogel contact lens of any one of embodiments 22 to 25, wherein the hydrophobic crosslinked acrylic material comprises at least about 80% by mole of repeating units of said one or more acrylic monomers and/or said one or more acrylic crosslinker.
29. The method or embedded hydrogel contact lens of any one of embodiments 22 to 28, wherein the crosslinked polymeric material comprises at least about 25% by mole of repeating units of said at least one vinylic crosslinking agent.
30. The method or embedded hydrogel contact lens of any one of embodiments 22 to 28, wherein the hydrophobic crosslinked acrylic material comprises at least about 30% by mole of repeating units of said at least one vinylic crosslinking agent.
31. The method or embedded hydrogel contact lens of any one of embodiments 22 to 28, wherein the hydrophobic crosslinked acrylic material comprises at least about 35% by mole of repeating units of said at least one vinylic crosslinking agent.
32. The method or embedded hydrogel contact lens of any one of embodiments 22 to 31, wherein said at least one vinylic crosslinking agent comprises at least one acrylic crosslinking agent.
33. The method or embedded hydrogel contact lens of embodiment 32, wherein said at least one acrylic crosslinking agent is ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'- methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl) isocyanurate triacrylate, tris(2-hydroxyethyl) isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

34. The method or embedded hydrogel contact lens of embodiment 32, wherein said at least one acrylic crosslinking agent is allyl (meth)acrylate, pentaerythritol tetra(meth)acrylate, Neopentyl glycol di(meth)acrylate, an aryl crosslinking agent, triallyl isocyanurate, 2,4,6-triallyloxy-1,3,5-triazine, 1,2,4-trivinylcyclohexane, or combinations thereof.

35. The method or embedded hydrogel contact lens of any one of embodiments 22 to 34, wherein said at least one vinylic crosslinking agent comprises divinylbenzene, 2-methyl-1,4-divinylbenzene, bis(4-vinylphenyl)methane, 1,2-bs(4-vinylphenyl)ethane, or combinations thereof.

36. The method or embedded hydrogel contact lens of any one of embodiments 22 to 35, wherein the hydrophobic crosslinked acrylic material comprises repeating units of at least one silicone-containing acrylic monomer.

37. The method or embedded hydrogel contact lens of any one of embodiments 22 to 36, wherein the hydrophobic crosslinked acrylic material comprises repeating units of at least one fluorine-containing acrylic monomer.

38. The method or embedded hydrogel contact lens of embodiment 37, wherein said at least one fluorine-containing acrylic monomer is perfluorohexylethylthio-carbonyl-aminoethyl-methacrylate, 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, or combinations thereof.

39. The method or embedded hydrogel contact lens of any one of embodiments 22 to 38, wherein the hydrophobic crosslinked acrylic material comprises repeating units of at least one polysiloxane vinylic crosslinker.

40. The method or embedded hydrogel contact lens of any one of embodiments 22 to 39, wherein the hydrophobic crosslinked acrylic material comprises repeating units of at least one aryl acrylic monomer of formula (I) or (II)

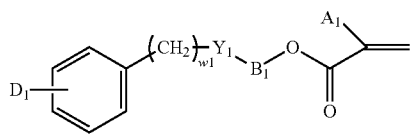
(I)

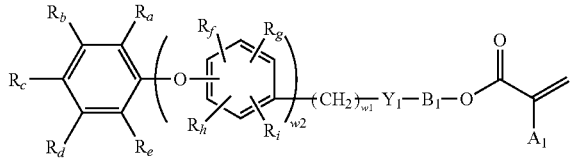
(II)

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1–10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

41. The method or embedded hydrogel contact lens of embodiment 40, wherein said at least one aryl acrylic monomer comprises at least one vinylic monomer selected from the group consisting of 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl) ethyl acrylate; 2-(4-chlorophenyl)ethyl methacrylate; 2-(4-bromophenyl)ethyl acrylate; 2-(4-bromophenyl) ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate, and combinations thereof.

42. The method or embedded hydrogel contact lens of any one of embodiments 22 to 41, wherein the hydrophobic crosslinked acrylic material comprises repeating units of at least one hydrohobic vinylic monomer selected from the group consisting of a vinyl alkanoate, a vinyloxyalkane, styrene, vinyl toluene, vinyl chloride, vinylidene chloride, 1-butene, and combinations thereof.

43. The method or embedded hydrogel contact lens of any one of embodiments 22 to 42, wherein the hydrophobic insert is rigid.

44. The method of any one of embodiments 1-3 and 5-43 or the embedded hydrogel contact lens of any one of embodiments 4-43, wherein the bulk hydrogel material is a non-silicone hydrogel material.

45. The method or the embedded hydrogel contact lens of embodiment 44, wherein the non-silicone hydrogel material comprises at least 50% by mole of repeating units of at least one hydroxyl-containing vinylic monomer.

46. The method or embedded hydrogel contact lens of embodiment 45, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

47. The method of any one of embodiments 1-3 and 5-43 or the embedded hydrogel contact lens of any one of embodiments 4-43, wherein the bulk hydrogel material is a silicone hydrogel material 48. The method or embedded hydrogel contact lens of embodiment 48, wherein the silicone hydrogel material comprises (a) repeating units of at least one polysiloxane vinylic monomer and/or at least one first polysiloxane vinylic crosslinker and (b) repeating units of at least one hydrophilic vinylic monomer.

49. The method or embedded hydrogel contact lens of embodiment 48, wherein the silicone hydrogel material comprises (a) repeating units of at least one hydrophilized polysiloxane vinylic crosslinker comprising hydrophilized siloxane units each having one methyl substituent and one organic radical including at least one H-bond donor.

50. The method or embedded hydrogel contact lens of embodiment 49, wherein said at least one hydrophilized polysiloxane vinylic crosslinker comprises hydrophilized siloxane units each having one methyl substituent and one organic radical including at least one hydroxyl groups.

51. The method or embedded hydrogel contact lens of embodiment 49 or 50, wherein said at least one hydrophilized polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

52. The method or embedded hydrogel contact lens of any one of embodiments 49 to 51, wherein said at least one hydrophilized polysiloxane vinylic crosslinker comprises a vinylic crosslinker of formula (G)

(G)

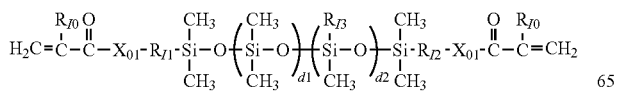

in which:
d1 is an integer of from 30 to 500 and d2 is an integer of from 1 to 75, provided that d2/d1 is from about 0.035 to about 0.15;
$X_{01}$ is O or $NR_{IN}$ in which $R_{IN}$ is hydrogen or $C_1$-$C_{10}$-alkyl;
$R_{I0}$ is hydrogen or methyl;
$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;
$R_{I3}$ is a monovalent radical of any one of formula (G-1) to (G-5))

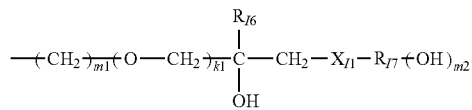
(G-1)

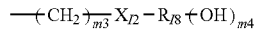
(G-2)

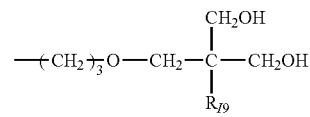
(G-3)

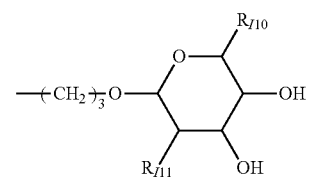
(G-4)

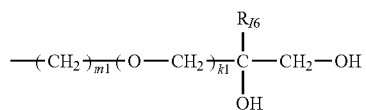
(G-5)

k1 is zero or 1; m1 is an integer of 2 to 4; m2 is an integer of 1 to 5; m3 is an integer of 3 to 6; m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydromethyl;
$R_{I11}$ is hydroxyl or methoxy;
$X_{I1}$ is a sulfur linkage of —S— or a tertiary amino linkage of —$NR_{I12}$— in which $R_{I12}$ is $C_1$-$C_1$ alkyl, hydroxyethyl, hydroxypropyl, or 2,3-dihydroxypropyl; and
$X_{I2}$ is an amide linkage of

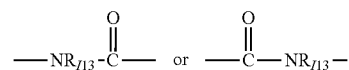

in which $R_{I13}$ is hydrogen or $C_1$-$C_{10}$ alkyl.

53. The method or embedded hydrogel contact lens of any one of embodiments 48 to 52, wherein the silicone hydrogel material comprises repeating units of: a di-(meth)acryloyl-terminated polydimethylsiloxane; a divinyl carbonate-terminated polydimethylsiloxane; a divinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.

54. The method or embedded hydrogel contact lens of any one of embodiments 48 to 52, wherein the silicone hydrogel material comprises repeating units of: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two terminal ethylenically-unsaturated groups selected from the group consisting of (meth)acryloyloxy groups, (meth)acryloylamino groups, vinyl carbonate groups, vinylcarbamate groups.

55. The method or embedded hydrogel contact lens of any one of embodiments 48 to 52, wherein the silicone hydrogel material comprises repeating units of: α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxy-ethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

56. The method or embedded hydrogel contact lens of any one of embodiments 48 to 55, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris (hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3, 3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinyl monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, ((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12)N-2-hydroxyethyl vinyl carbamate; (13) N-carboxyvinyl-β-alanine (VINAL); (14)N-carboxyvinyl-α-alanine; (15) or combinations thereof.

57. The method or embedded hydrogel contact lens of any one of embodiments 48 to 55, wherein said at least one hydrophilic vinylic monomer comprises N-vinylpyrrolidone, N-vinyl-N-methyl acetamide, or combinations thereof.

58. The method or embedded silicone hydrogel contact lens of any one of embodiments 48 to 57, wherein said at least one hydrophilic vinylic monomer comprises at least one (meth)acrylamido monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-(meth)acrylamidoglycolic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 3-(meth)acrylamidohaxanoic acid, 4-(meth)acrylamido-3,3-dimethylhexanoic acid, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, methoxy-poly(ethylene glycol)ethyl (meth)acrylamide having a number average molecular weight of up to 1500, and combinations thereof.

59. The method or embedded silicone hydrogel contact lens of any one of embodiments 48 to 57, wherein said at least one hydrophilic vinylic monomer comprises (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, or combinations thereof.

60. The method or embedded hydrogel contact lens of any one of embodiments 48 to 59, wherein said at least one hydrophilic vinylic monomer comprises 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, or combinations thereof.

61. The method or embedded hydrogel contact lens of any one of embodiments 48 to 60, wherein the silicone hydrogel material comprises at least one polysiloxane vinylic monomer selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxypropyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy) dimethylbutylsilane) (meth)acrylamide, (meth) acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, and a mixture thereof.

62. The method or embedded hydrogel contact lens of any one of embodiments 48 to 61, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

63. The method or embedded hydrogel contact lens of any one of embodiments 48 to 61, wherein the silicone hydrogel material comprises repeating units of at least one silicone-containing vinylic monomer of formula (M1) or (M2)

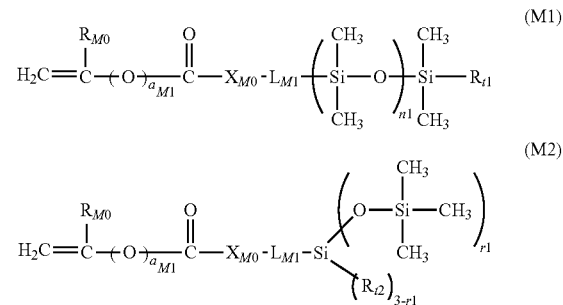

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of -$L_{M1}'$-$X_{M1}$-$L_{M1}''$-,

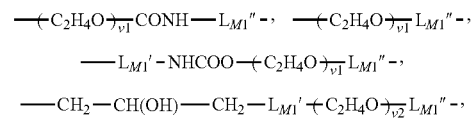

-$L_{M1}'$-$X_{M1}'$—$CH_2$—CH(OH)·$CH_2$—O-$L_{M1}''$-, or

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

64. The method or embedded hydrogel contact lens of any one of embodiments 48 to 61, wherein the silicone hydrogel material comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]

propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

65. The method or embedded hydrogel contact lens of any one of embodiments 48 to 64, wherein the silicone hydrogel material comprises repeating units of at least one non-silicone vinylic cross-linking agent.

66. The method or embedded hydrogel contact lens of embodiment 65, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

67. The method or embedded hydrogel contact lens of any one of embodiments 48 to 66, wherein the silicone hydrogel material comprises repeating units of at least one blending vinylic monomer.

68. The method or embedded hydrogel contact lens of embodiment 67, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoroisopropyl (meth)acrylate, hexafluorobutyl (meth)acrylate, or combinations thereof.

69. The method or embedded hydrogel contact lens of any one of embodiments 48 to 68, wherein the silicone hydrogel material comprises repeating units of at least one polymerizable material selected from the group consisting of a UV-absorbing vinylic monomer, a UV/HEVL-absorbing vinylic monomer, a photochromic vinylic monomer, a polymerizable dye, and combinations thereof.

70. The method or embedded hydrogel contact lens of any one of embodiments 48 to 69, wherein the silicone hydrogel material has an equilibrium water content (i.e., in fully hydrated state or when being fully hydrated) of from about 20% to about 70% by weight, an oxygen permeability of at least about 40 barrers, and a modulus (i.e., Young's modulus) of from about 0.2 MPa to about 1.5 MPa.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of an insert and an insert material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a silicone hydrogel material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Delamination

Embedded hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (Model JCF; OPTIMEC England). After the contact lens is settled under the influence of gravity, the front view of the contact lens is inspected carefully for any sign of circular pattern. Delamination displays as circular patterns in Optimec image.

OCT (Spectral Domain Optical Coherence Tomography; Telesto-II; Thorlabs) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: PETA represents pentaerythritol tetraacrylate; TrisMA represents 3-[Tris(trimethylsiloxy)silyl]propyl methacrylate; HFIPMA represents hexafluoroisopropyl methacrylate; NPGDMA represents neopentyl glycol dimethacrylate; DMA represents N,N-dimethyl acrylamide; MMA represent methyl methacrylate; TEGDMA represent triethyleneglycol dimethacrylate; VAZO 67 represents 2,2'-azobis(2-methylbutyronitrile); RB247 is Reactive Blue 247; EGBE represents ethylene glycol butyl ether; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; PrOH represents 1-propanol; "H4" macromer represents a di-methacryloyloxypropyl-terminated polysiloxane (Mn~11.3K-12.3K g/mol, OH content~1.82-2.01 meq/g) of formula (A) shown below.

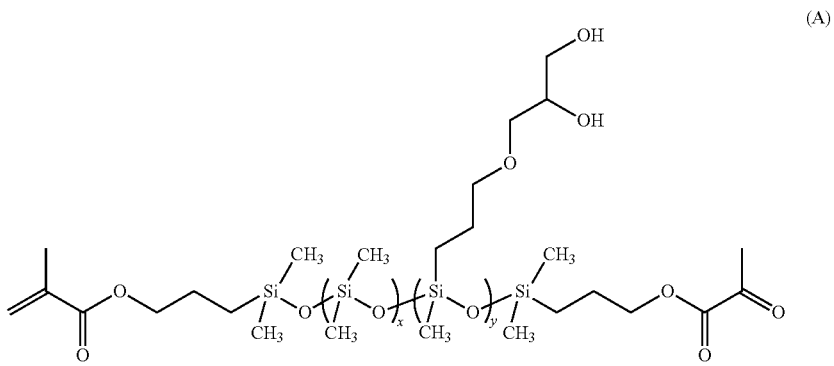

(A)

Example 2

Insert-Forming Compositions

A base insert-forming compositions (i.e., Insert formulations) for making rigid hydrophobic inserts are prepared at room temperature in air by blending all the components (materials) as following: 39.13 weight part units of HFIPMA; 18.26 weight part units of NPGDMA; 39.13 weight part units of TrisMA; 2.61 weight part units of PETA; 0.43 weight part units of RB247; and 0.43 weight part units of Vazo-67.

Lens-Forming Compositions

A lens-forming composition (i.e., SiHy lens formulation) is prepared at room temperature in air by blending all the components (materials) as following: 28.45 weight part units of H4; 14.66 weight part units of TrisMA; 20.69 weight part units of DMA; 12.93 weight part units of MMA; 0.86 weight part units of TEGDMA; 21.98 weight part units of EGBE; and 0.43 weight part units of Vazo-67.

Preparation of Embedded Silicone Hydrogel Contact Lenses

An insert-forming composition prepared above is purged with nitrogen at room temperature for 30 to 35 minutes. An amount of the $N_2$-purged insert-forming composition is disposed in the center of the molding surface of a female insert mold half that is made of polypropylene. The female insert mold half with the insert-forming composition therein is closed with a male insert mold half which is made of polypropylene. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions in the insert molds are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The insert molds are opened and the molded inserts are removed from the insert-adhered mold halves.

Figure 2:
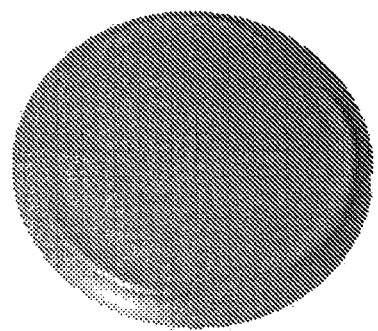
FIG. 2 illustrates an insert of the invention that comprises alignment features on its front surface according to another preferred embodiment of the invention.

Two groups of inserts are prepared. The first groups of inserts each comprise three oval bumps on the front surfaces of the inserts as shown in FIG. 1. The second groups of inserts each comprise three ridges in a shape of arc as shown in FIG. 2.

An insert prepared above is placed precisely in the central region of the molding surface of a female lens mold half (made of polypropylene), an amount of a SiHy lens formulation prepared above is dosed in the female lens mold half to immerse the insert, a polypropylene male lens mold half is then placed on top the female mold half, and the mold is closed securely.

The closed lens mold with an insert immersed in a SiHy lens formulation therein are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The lens molds are opened and the molded embedded hydrogel lens precursors are removed from the lens molds.

Lens molds each with a molded silicone hydrogel lens precursor therein are mechanically opened. The molded embedded silicone hydrogel lens precursor adhere to the male lens mold halves or female lens mold halves. Molded embedded silicone hydrogel lens precursors adhered to male lens mold halves are delensed using ultrasonic unit; molded embedded silicone hydrogel lens precursors adhered to female lens mold halves are delensed manually from lens-adhered female lens mold halves.

The delensed embedded silicone hydrogel lens precursors can be extracted with a mixture of 50:50 of propylene glycol:water. Preferably, the delensed embedded silicone hydrogel lens precursors are subjected to the following extraction/hydration, coating, autoclave processes as follows. The embedded silicone hydrogel lens precursors are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of an in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon.

Figure 3:
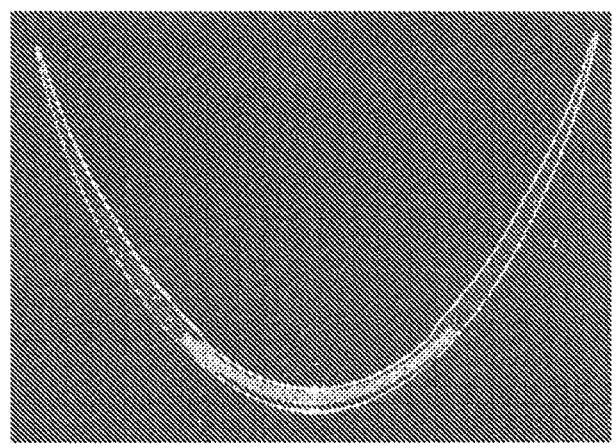
FIG. 3 shows the image of a cross section of an embedded silicone hydrogel contact lens comprising an insert of FIG. 1 embedded therein according to a preferred embodiment.

FIG. 3 shows an image of a cross-section of the embedded SiHy contact lens comprising an insert of FIG. 1.

Figure 4:
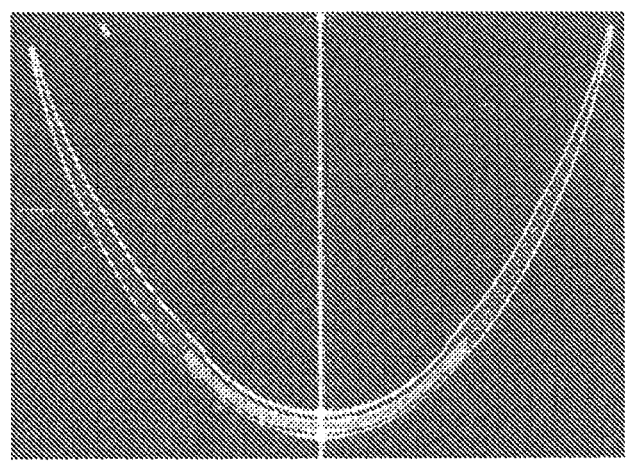
FIG. 4 shows the image of a cross section of an embedded silicone hydrogel contact lens comprising an insert of FIG. 2 embedded therein according to a preferred embodiment.

FIG. 4 shows an image of a cross-section of the embedded SiHy contact lens comprising an insert of FIG. 2.

The obtained embedded SiHy contact lenses are examined for delamination according to the procedures described in Example 1. No bubble is observed under microscopy at interfaces between the insert and the SiHy bulk material within the embedded silicone hydrogel contact lens, i.e., no delamination.

All the publications, patents, and patent application publications, which have been cited herein above in this application, are hereby incorporated by reference in their entireties.

What is claimed is:

1. A method for producing embedded hydrogel contact lenses, comprising the steps of:
   (1) obtaining a lens mold, wherein the lens mold comprises a female lens mold half having a first molding surface and a male lens mold half having a second molding surface, wherein the first molding surface defines the anterior surface of an embedded hydrogel contact lens, wherein the second molding surface defines the posterior surface of the embedded hydrogel contact lens, wherein the female and male lens mold halves are configured to receive each other such that a mold cavity is formed between the first and second molding surfaces when the mold is closed;
   (2) obtaining an insert which is made of a polymeric material and comprises a front surface, an opposite back surface, a central axis, and a diameter up to about 13.0 mm, wherein the insert comprises alignment features on the front surface for centrally aligning the insert on the molding surface of the female lens mold half with respect to the central axis of the female lens mold half, wherein the alignment features protrude from the front surface, have an identical maximum height and are rotationally symmetric with respect to the central axis of the insert, wherein the alignment features have identical shapes each having a curvature that is at least 2 folds of the curvature of the molding surface at contacting point of each alignment feature with the first molding surface;
   (3) placing the insert in a female lens mold half in a way to ensure the insert be centered in the female lens mold half on the first molding surface;
   (4) introducing a lens-forming composition in the female lens mold half in an amount sufficient to immerse the insert in the female lens mold half;
   (5) placing the male lens mold half on top of the female lens mold half and closing the male and female lens mold halves to form a molding assembly comprising the lens-forming composition and the insert immersed therein in the molding assembly;
   (6) curing the lens-forming composition in the molding assembly to form an embedded hydrogel lens precursor that comprise a bulk hydrogel material formed from the lens-forming composition and the insert embedded in the bulk hydrogel material and centered in the embedded hydrogel lens precursor;
   (7) separating the lens mold obtained in step (6) into the male and female lens mold halves, with the embedded hydrogel lens precursor adhered on a lens-adhered lens mold half which is one of the male and female lens mold halves;

(8) removing the embedded hydrogel lens precursor from the lens-adhered lens mold half; and (9) subjecting the embedded hydrogel lens precursor to post-molding processes including a hydration process and one or more other processes selected from the group consisting of extraction, surface treatment, packaging, sterilization, and combinations thereof to form the embedded hydrogel contact lens.

2. The method of claim 1, wherein the step of (6) curing the lens-forming composition is carried out actinically by using UV and/or visible light.

3. The method of claim 1, wherein the step of (6) curing the lens-forming composition is carried out thermally by heating the first molding assembly in an oven at one or more curing temperatures selected from about 40° C. to about 100° C.

4. The method of claim 1, wherein the alignment features are bumps, circle bumps, ridges, ridges in a shape of arc, or combinations thereof.

5. The method of claim 4, wherein the insert comprises 3 alignment features.

6. The method of claim 4, wherein the alignment features are located in an annual zone having an inner circular edge, an outer circular edge that is the peripheral edge of the front surface of the insert, and a width of about 3.0 mm or less.

7. The method of claim 4, wherein the polymeric material of the insert is: (i) a crosslinked polymethylmethacrylate; (ii) a crosslinked silicone polymer that has three-dimensional polymer networks, is insoluble in water, and has an equilibrium water content of about 5% or less by weight; (iii) a rigid gas permeable material; or (iv) a hydrophobic crosslinked acrylic material that has an equilibrium water content of less than 5% by weight and comprises at least 55% by mole of repeating units of one or more acrylic monomers and/or one or more acrylic crosslinker and at least about 6% by mole of repeating units of at least one vinylic crosslinking agent, wherein the hydrophobic crosslinked acrylic material comprises: repeating units of at least one silicone-containing acrylic monomer; repeating units of at least one fluorine-containing acrylic monomer; repeating units of at least one polysiloxane vinylic crosslinker; repeating units of at least one aryl acrylic monomer; repeating units of at least one hydrophobic vinylic monomer selected from the group consisting of a vinyl alkanoate, a vinyloxyalkane, styrene, vinyl toluene, vinyl chloride, vinylidene chloride, 1-butene, and combinations thereof; or combinations thereof.

8. The method of claim 7, wherein the polymeric material of the insert comprises: (i) repeating units of at least one polymerizable photochromic compound, at least one UV-absorbing vinylic monomer, at least one UV/HEVL-absorbing vinylic monomer, at least one fluorescent vinylic monomer, or combinations thereof, (ii) at least one color-filtering material for correcting color blindness, a diffractive material, a high refractive-index material, or combinations, or (iii) combinations thereof.

9. The method of claim 7, wherein the bulk hydrogel material is a non-silicone hydrogel material.

10. The method of claim 9, wherein the non-silicone hydrogel material comprises at least 50% by mole of repeating units of at least one hydroxyl-containing vinylic monomer selected from the group consisting of hydroxyethyl (meth) acrylate, glycerol (meth) acrylate, 3-hydroxypropyl (meth) acrylate, 2-hydroxypropyl (meth) acrylate, 3-amino-2-hydroxypropyl (meth) acrylate, N-2-hydroxyethyl (meth) acrylamide, N-3-hydroxypropyl (meth) acrylamide, N-2-hydroxypropyl (meth) acrylamide, N-2,3-dihydroxypropyl (meth) acrylamide, N-tris (hydroxymethyl) methyl (meth) acrylamide, vinyl alcohol, allyl alcohol, and combinations thereof.

11. The method of claim 7, wherein the bulk hydrogel material is a silicone hydrogel material that comprises (a) repeating units of at least one polysiloxane vinylic monomer and/or at least one first polysiloxane vinylic crosslinker and (b) repeating units of at least one hydrophilic vinylic monomer.

* * * * *